A. C. BLETHEN.
Nose-Clamp for Eyeglasses.

No. 222,123.   Patented Dec. 2, 1879.

Witnesses:
H. S. Talbot
W. R. Marble

Inventor:
Alonzo C. Blethen,
By Sylvenus Walker
Attorney

UNITED STATES PATENT OFFICE.

ALONZO C. BLETHEN, OF LYNN, MASSACHUSETTS.

IMPROVEMENT IN NOSE-CLAMPS FOR EYEGLASSES.

Specification forming part of Letters Patent No. 222,123, dated December 2, 1879; application filed July 7, 1879.

*To all whom it may concern:*

Be it known that I, ALONZO C. BLETHEN, of Lynn, in the county of Essex and State of Massachusetts, have invented certain new and useful Improvements in Eyeglasses, of which the following is a specification.

The object of my invention is to provide a cheap, simple, and convenient means for more permanently securing, or attaching temporarily, or while in use, eyeglasses to the nose of the wearer, so they shall better retain their gripe or hold upon the nose without pinching unduly, or so as to cause a disagreeable sensation to the wearer, as in those heretofore constructed, wherein a hard roughened surface contacts with the sides of the nose sufficiently to retain such in the desired position; and it consists in the construction, combination, and arrangement of attaching-clips having hooks, and provided with an elastic rubber tube, with the frames of eyeglasses, as hereinafter more fully described and set forth.

Figure 1:
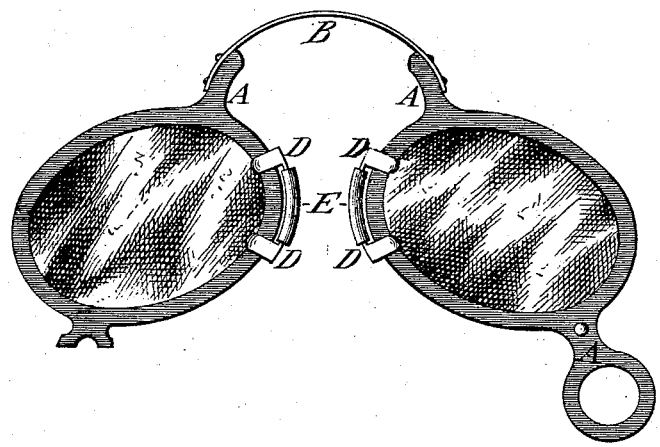
Figure 2:
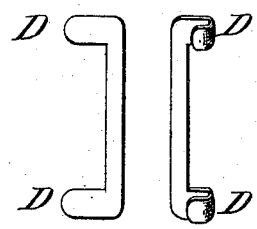
Figure 3:

Figure 1 represents an eyeglass containing my invention as applied thereto. Fig. 2 represents a view of my invention removed from the eyeglass-frame, and is a view of the attaching-clips removed from the elastic rubber tube. Fig. 3 is a view of the rubber tube.

A represents the frame for the glasses, as usual, and B represents the spring which connects the frames A, as shown in Fig. 1.

E represents a small, short, elastic rubber tube, which is provided with two metal attaching-clips, C, each end of which is provided with lateral curved hooks D, which engage with the projecting edges of the frame A when placed thereon, as shown in Fig. 1.

It will be seen that the sheet-metal attaching-clips C are inserted into the interior of the rubber tube E, and extend longitudinally through the same, leaving the hooks D projecting at each end of the said tube. These attaching-clips C are formed in pairs, and two are placed in each tube, one upon the other, flatwise, the points of the hooks D turning inward or toward each other, so that the elastic property of the rubber tube E surrounding them will permit the hooks at each end of the same to be drawn apart sufficiently to pass over the edges or sides of the frame A, when the rubber tube resumes its former position, thus retaining the device in place. The soft elastic rubber surface of the exterior of the tube E, coming in direct contact with the skin of the nose, tends to retain the glasses in position in a more agreeable manner than by the common method of a rough, hard surface.

Having thus described my invention, what I claim is—

In combination with the frame A, the attaching-clips C, having hooks D, and provided with the elastic rubber tube E, all being constructed and arranged substantially in the manner described, as and for the purposes set forth.

ALONZO C. BLETHEN.

Witnesses:
 NATHAN D. A. CLARKE,
 FRED UPTON.